(12) United States Patent
Lin

(10) Patent No.: US 7,799,466 B2
(45) Date of Patent: Sep. 21, 2010

(54) LEAD ACID BATTERY HAVING LIGHTLY GELLED ELECTROLYTE

(75) Inventor: Yi-Ming Lin, Taipei (TW)

(73) Assignee: Hirate Energy Technology Corporation Ltd., Mong Kok, Kowloon, Hong Kong (HK)

( * ) Notice: Subject to any disclaimer, the term of this patent is extended or adjusted under 35 U.S.C. 154(b) by 1068 days.

(21) Appl. No.: 11/306,112

(22) Filed: Dec. 16, 2005

(65) Prior Publication Data

US 2007/0141472 A1 Jun. 21, 2007

(51) Int. Cl.
*H01M 6/14* (2006.01)
*H01M 6/04* (2006.01)

(52) U.S. Cl. .................. 429/302; 429/188; 429/204; 429/300

(58) Field of Classification Search .................. 429/204, 429/302
See application file for complete search history.

(56) References Cited

U.S. PATENT DOCUMENTS

| 4,317,872 | A | | 3/1982 | Varma |
| 4,414,302 | A | * | 11/1983 | Jache et al. .................. 429/302 |
| 4,871,428 | A | | 10/1989 | Misra et al. |
| 4,889,778 | A | | 12/1989 | Misra et al. |
| 2002/0192562 | A1 | * | 12/2002 | Ferreira et al. .............. 429/300 |
| 2003/0054236 | A1 | * | 3/2003 | Zucker ....................... 429/145 |
| 2005/0042512 | A1 | * | 2/2005 | Ferreira et al. .............. 429/204 |
| 2005/0084762 | A1 | * | 4/2005 | Vaccaro et al. .............. 429/302 |

* cited by examiner

*Primary Examiner*—Dah-Wei D Yuan
*Assistant Examiner*—Steven Scully
(74) *Attorney, Agent, or Firm*—Winston Hsu

(57) ABSTRACT

A lead acid battery having lightly gelled electrolyte is provided. The lead acid battery includes a plurality of alternating positive plates and negative plates, a plurality of separators sandwiched in between the positive plates and the negative plates, and a lightly gelled electrolyte including dilute sulfuric acid and silica particles substantially in the range of 0.1% to 3% of the electrolyte by weight. The silica particles are fumed silica particles.

6 Claims, 2 Drawing Sheets

LEAD ACID BATTERY HAVING LIGHTLY GELLED ELECTROLYTE

BACKGROUND OF THE INVENTION

1. Field of the Invention

The present invention relates to a lead acid battery, and more particularly, to an improved valve regulated lead acid battery having lightly gelled electrolyte.

2. Description of the Prior Art

Lead acid batteries, developed in the late 1800s, were the first commercially practical batteries. Rechargeable lead acid batteries have been available since the 1950s and have become the most widely used type of batteries in the world. The following equation shows the discharge chemical reaction in a lead acid cell:

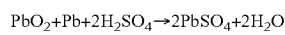

$$PbO_2+Pb+2H_2SO_4 \rightarrow 2PbSO_4+2H_2O$$

Lead acid batteries remain popular because they can produce high or low currents over a wide range of temperatures and have good shelf life and life cycles. Furthermore, they are relatively inexpensive to manufacture and purchase. Another advantage of the lead acid batteries is they come in all manner of shapes and sizes, from household batteries to large batteries for use in submarines.

Valve regulated lead acid (VRLA) batteries are one kind of the lead acid batteries. A VRLA battery comprises positive plates, negative plates, separators, electrolyte, and a container with one-way valve installed to prevent external gases from entering the battery where the oxygen would react with the plates then causing internal discharge and allow gas to vent from the interior of the battery when a certain internal pressure is exceeded. Please refer to FIG. 1. FIG. 1 is a sectional view of a conventional lead acid battery. As shown in FIG. 1, a lead acid battery 10 comprises a plurality of alternating positive plates 12 and negative plates 14 with separators 16 sandwiched in between the adjacent plates and electrolyte (not shown). The positive plates 12 and the negative plates 14 are made by a formation process which converts lead grids pasted with positive active material such as lead oxide, and with negative active material such as lead powder into the positive plates 12 and negative plates 14 respectively.

In a VRLA battery, the electrolyte is generally immobilized. The immobilization of the electrolyte in a VRLA battery makes it possible for the gases generated at one electrode have an access to the other electrode during charging. As a result the oxygen gas is able to travel inside the battery, and is reduced at the surface of the negative plates and returned to the electrolyte of the battery. Additionally, the immobilization of the electrolyte also prevents the liquid electrolyte from the danger of spilling which is highly acidic and corrosive.

There are two mainly well-known categories of methods to immobilize the electrolyte in a lead acid battery: by absorption or gelling. U.S. Pat. No. 4,871,428 discloses a glass mat separator made from glass microfibers and used to immobilize the liquid electrolyte by absorption, and firmly and intimately contact the plates, thereby assuring good initial electrolyte-plate contact and hence higher energy efficiency. However, the intimate contact between the glass mat separator and the plate surfaces easily forms a needle-like dendrite at the negative plate then growing into a tunnel-like passage way contacting the positive plate through the adjacent separator pore, thus finally shorting the battery.

U.S. Pat. No. 4,317,872 discloses an alternative method to immobilize the electrolyte by reacting sulfuric acid with silica particles to form a gel electrolyte. However, the gel electrolyte suffers various inferior electrical properties such as higher internal electrical resistance, lower energy capacity, and reduced cycling characteristics. In addition, the gel electrolyte has a tendency to shrink so that the contact between the gel electrolyte and the active material on the plates may be interrupted. Furthermore, the initial high viscosity of the gel also presents a challenge of being difficult to fill a battery container, and being not able to efficiently saturate the pores of the plates.

U.S. Pat. No. 4,889,778 discloses a thixotropic gel electrolyte consisting of a blend of an aqueous colloidal dispersion of about thirty percent (30%) by weight alkali metal polysilica having the formula $[Y_2O]_x[SiO_2].nH_2O$ with sulfuric acid in a ratio of 1:3 to 1:6 by volume. The x ranges from about 20 to 350, Y is an alkali metal and n is the number of moles of water. Finally, U.S. Pat. Publication No. 2005/0042512 discloses a lead acid battery electrolyte comprises sulfuric acid having a specific gravity between 1.250 and 1.280 and silica particles in a concentration between 2 and 15 weight percent. At least 10% by weight of the silica particles are from a never-dried precipitated silica slurry.

While the prior art describes the improved gel electrolyte preparation methods facilitating filling of the container, the gel electrolyte based lead acid battery still has general inferior electrical properties than those made with ordinary liquid electrolyte such as growing internal electrical resistance during discharge, lower energy capacity caused by reduced amount of active electrolyte material, and potential shrinkage problem caused by high silica content, etc.

SUMMARY OF THE INVENTION

It is therefore a primary object of the claimed invention to provide a VRLA battery based on an immobilized electrolyte, which is lightly gelled to overcome the aforementioned problems.

According to the claim of the present invention, a lightly gelled electrolyte of a lead acid battery comprises a dilute sulfuric acid and silica particles substantially in the range of 0.1% to 3% of the electrolyte by weight. The silica particles are fumed silica particles.

According to the claim of the present invention, a lead acid battery having lightly gelled electrolyte is further provided. The lead acid battery comprises a plurality of alternating positive plates and negative plates, a plurality of separators sandwiched in between the positive plates and the negative plates, and a lightly gelled electrolyte comprising dilute sulfuric acid and silica particles substantially in the range of 0.1% to 3% of the electrolyte by weight. The silica particles are fumed silica particles.

The lead acid battery having lightly gelled electrolyte provided by the present invention has significant improvement in electrical properties such as low internal resistance, high rate charging capability, higher energy density, and free of electrolyte shrinkage problems. It is particular suitable as a cost effective battery for applications requiring high charging rate and high energy capacity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
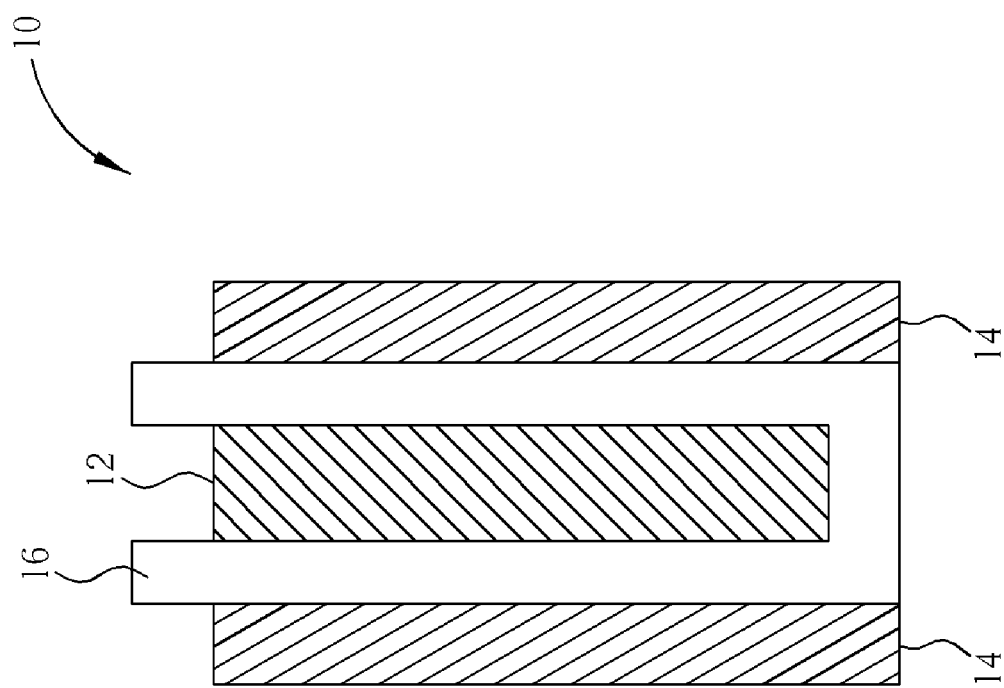
FIG. 1 is the sectional view of a conventional lead acid battery.

The present invention is hereinafter explained in more detail by embodiment and examples. However, the present invention is not restricted by the embodiment and examples.

The present invention is based upon the discovery of a new way of immobilizing electrolyte in a lead acid battery, in particular a VRLA battery. In this embodiment of the present invention, a lightly gelled electrolyte is prepared by mixing sulfuric acid with a specific gravity of 1.28 to 1.34, and a small amount of silica particles, wherein the amount of silica particles is substantially in the range of 0.1% to 3%, more preferably, in the range of 0.5% to 1% of the electrolyte by weight.

Initially, the lightly electrolyte has a low viscosity and is free flowing over an extended period of time. However, it is observed that after about 2 to 3 cycles of charging/discharging in a lead acid battery, a firmer localized pasty lumpy gel starts to form throughout the electrolyte, particularly at the surface region of the glass mat adjacent to the plates, as a mixed two-phase electrolyte. Furthermore, the mixed two-phase electrolyte of the present invention can be reversed back to mostly a liquid phase under a high rate charging condition. Eventually, the entire electrolyte turns into a phase of firmer pasty gel during discharging after repeatedly discharging/charging cycles.

Depending on the type and amount of silica particles used, the lightly gelled electrolyte is either substantially clear or slightly hazy. When fumed silica is used, the resulting electrolyte is slightly hazy, and its haziness increases slowly as time passes. Examples of suitable fumed silica are Degussa AEROSIL® 200, 200V, pre-dispersed AERODISP® W 7520 (stabilized with ammonia), or W 7520 N (stabilized with sodium hydroxide).

There is no special requirement for the mixing equipment. Various conventional mixers such as propeller stirrer, Cowless dissolver, etc., and any acid resistant container, such as Teflon coated tank, can be used. However, the mixing speed must be adequate in order to obtain a homogeneous solution, and to avoid or to minimize undesirable aggregation or precipitation. For example, a propeller stirrer with a mixing speed at about 1250 to 2000 rpm is used to mix a dilute sulfuric acid with the slowly added fumed silica over a period of about 20 minutes, followed by another 10 minutes to finish the mixing. During mixing, the temperature of the mixture is maintained under 40° C.

The immobilization of the electrolyte is achieved by combining the absorption capability of the glass mat and the light gelling of the electrolyte. Generally, the electrolyte is absorbed into the glass mat separator efficiently without assistance. However, a vacuum assisted filling step has shown to be advantageous to facilitate the absorption of the lightly gelled electrolyte into the separator and plates.

It is noteworthy that because of the low viscosity of the electrolyte in a fully charged state and the presence of hydrophilic silica particles preventing dry out in separator pores, the lead acid battery having lightly gelled electrolyte of the present invention has low internal resistance for efficient charging, and is capable of attaining high energy density, providing longer discharge time and higher current or discharge rate when needed. Upon discharging, because the reversible pasty gel lumps are formed in the pores of the glass mat, and are adjacent to the surface of the plates, these gel lumps presumably protect the plates by disrupting the growth of dendrites and preventing or slowing the deteriorating problems such as shedding of the active paste materials from the plate surface. Therefore the lead acid battery having lightly gelled electrolyte of the present invention generally provides a longer cycle life than expected.

Furthermore, while plate formation in an assembled battery is possible, pre-formed plates are preferred. Additionally, while glass mat separator is preferred, alternative electrolyte absorptive separators such as an acid resistant polymeric non-woven sheet can also be used. For example, polyolefin or polyester based non-woven with proper hydrophilic surface treatment, are suitable absorptive separators.

The following examples are set forth to more fully illustrate the preferred embodiment of the invention. These examples, however, are not meant to be limiting. It is possible to produce still other embodiment without departing from the inventive concept herein disclosed. Such embodiments are within the ability of one skilled in the art.

Example 1

100 g fumed silica, e.g., Degussa Aerosil 200, is first mixed with 900 g of de-ionized water to a homogeneous mixture. Separately, 9 kg of a diluted sulfuric acid of specific gravity of 1.32 is placed in an acid resistant tank equipped with a propeller mixer. The fumed silica mixture is gradually added into the diluted sulfuric acid within the mixer running at 1457 rpm over a period of 20 minutes. After the completion of addition, the mixer continues to run for 10 minutes until a homogeneous mixture is obtained. It is observed that the viscosity of the lightly gelled electrolyte obtained is slightly higher than the sulfuric acid before mixing, and the mixture is slightly hazy. The haziness increases as time passes, but remain to be free flowing over the next three weeks. A 12-volt battery rated at 12 ampere-hours (AH) is assembled and filled with the lightly gelled electrolyte for testing. The electrical resistance of the electrolyte between two copper wires at a separation of 50 mm is measured and shown in Table 1. The lead acid battery having lightly gelled electrolyte of the present invention is subject to a discharge test, and the discharging times under various initial discharge rates are summarized in Table 2.

Example 2

Following the same generally procedure as EXAMPLE 1, except that a dilute sulfuric acid of specific gravity of 1.33 is used for electrolyte preparation, and the mixer runs at 1360 rpm. The general characteristics of the lightly gelled electrolyte are the same as observed in EXAMPLE 1. The electrical resistance of the electrolyte is shown in Table 1. The initial discharge test results are summarized in Table 2.

Comparative Example 1

For comparison, a 12-volt battery rated at 12 ampere-hours (AH) is assembled and filled with regular sulfuric acid of specific gravity of 1.32. The electrical resistance of the electrolyte is shown in Table 1. The initial discharge test results are also summarized in Table 2.

TABLE 1

| | Example 1 | Example 2 | Comparative Example 1 |
|---|---|---|---|
| Electrical Resistance | 3.10Ω | 3.00Ω | 2.80Ω |

1) Measured between two copper wires at a separation of 50 mm.

TABLE 2

| | Example 1 | Example 2 | Comparative Example 1 |
|---|---|---|---|
| 2 Hr. Rate @0.42 C | 02:17:31 | 02:28:37 | 02:27:54 |
| 5 Hr. Rate @0.17 C | 06:42:16 | 07:13:57 | — |
| 10 Hr. Rate @0.1 C | 11:30:55 | 12:17:20 | — |
| 20 Hr. Rate @0.05 C | 23:09:16 | 26:43:46 | 22:10:33 |
| 33 Min. Rate @1 C | 50:27 | 57:09 | 53:27 |
| 7.2 Min. Rate @3 C | 12:35 | 13:39 | 13:36 |

1) All the batteries are 12-volt, rated at 12 ampere-hours (AH).
2) Discharge time is recorded as Hour:Min:Second.

As shown in Table 1, although the electrical resistances of the lightly gelled electrolytes are slightly higher than regular diluted sulfuric acid, the amount of increases are small, and their impact on battery discharge properties are negligible at 2 Hr. discharge rate. In fact, in general the 20 Hr. discharge rates of Examples 1-2 show unexpected improvements over a standard sulfuric acid battery performance of Comparative Example 1. These data illustrate that the present invention are particularly suitable for applications which require extended discharge time, such as for electrical bicycles and outdoor solar lighting.

Furthermore, Table 2 also shows that the high rate discharge results, such at 1C and 3C, of the present invention are unexpectedly either in the same range, or can be greater than a standard sulfuric acid battery.

Figure 2:
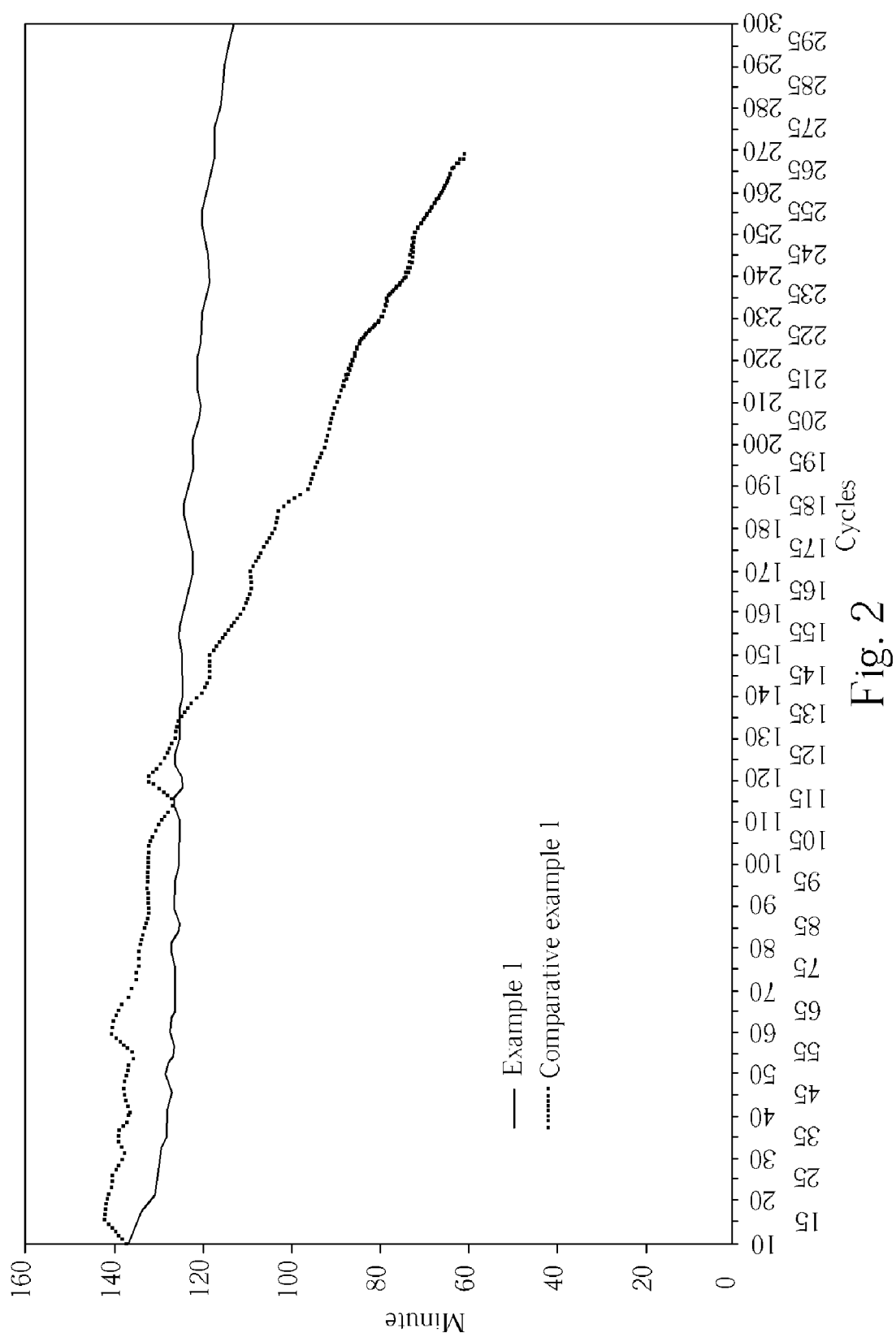
FIG. 2 is the drawing comparing curves of discharge times over 300 life cycles between a comparative standard battery and the lead acid batteries having lightly gelled electrolytes.

To further illustrate the improved performance of the present invention, FIG. 2 shows the curves of discharge times over 300 life cycles of Example 2. Significantly and unexpectedly the batteries of present invention are found to provide much greater capabilities to sustain longer discharge times than a conventional battery of Comparative Example 1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A valve regulated lead acid battery having lightly gelled electrolyte comprising:
   (a) a container;
   (b) a positive plate and a negative plate disposed in the container;
   (c) an electrolyte-absorptive separator sandwiched in between the positive plate and the negative plate in the container;
   (d) a lightly gelled electrolyte providing electrolytic connection between the positive plate and the negative plate in the container, the light gelled electrolyte comprising:
   (e) a dilute sulfuric acid having a specific gravity of 1.28 to 1.34; and
   (f) an amount of fumed silica particles in the range of 0.1% to 3% of the electrolyte by weight;
   wherein the silica particles forms reversible pasty gel lumps in the pores of the separator during charging-discharging cycles, and the reversible gel lumps adjacent to the surface of the plates disrupt the growth of dendrites and prevent shedding of the active paste materials from the plate surfaces to provide a cycle life greater than 300 cycles at a minimal discharging time greater than 115 minutes.

2. The lead acid battery of claim 1, wherein the amount of silica particles is in the range of 0.5% to 1% of the electrolyte by weight.

3. The lead acid battery of claim 1, wherein the separator is a glass mat.

4. The lead acid battery of claim 1, wherein the separator is a polymeric non-woven sheet.

5. The lead acid battery of claim 1, wherein the separator is polyolefin.

6. The lead acid battery of claim 1, wherein the separator is polyester based non-woven sheet.

* * * * *